3,252,972
(N,N-BICYCLOALKYLENE-IMINO)-LOWER
ALKYL-GUANIDINES
Robert Paul Mull, Florham Park, N.J., assignor to Ciba
Corporation, New York, N.Y., a corporation of Delaware
No Drawing. Filed Apr. 10, 1962, Ser. No. 186,362
33 Claims. (Cl. 260—239)

This is a continuation-in-part application of my application Serial No. 54,593, filed September 8, 1960, now abandoned, which in turn is a continuation-in-part application of my application Serial No. 851,970, filed November 10, 1959, now U.S. Patent 3,078,272.

The present invention concerns guanidine compounds. More particularly, it relates to (N,N-bicycloalkylene-imino)-lower alkyl-guanidines, in which the bicycloalkylene portion of the N,N-bicycloalkylene-imino radical has a total of from five to sixteen carbon atoms as ring and bridge members, and in which the guanidino group has the meaning given hereinbelow, salts or quaternary ammonium compounds thereof, as well as a process for the manufacturing of such compounds.

The N,N-bicycloalkylene-imino radical is represented by the formula:

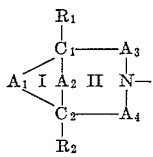

in which $A_1$ stands for an alkylene radical, which links the $C_1$-carbon atom with the $C_2$-carbon atom and has from one to five carbon atoms, or an alkenylene radical, which links the $C_1$-carbon atom with the $C_2$-carbon atom and has from two to five carbon atoms, $A_2$ is a direct bond between the $C_1$-carbon atom and the $C_2$-carbon atom, or it stands for an alkylene radical, which separates the $C_1$-carbon atom from the $C_2$-carbon atom by from one to three carbon atoms and has a total of from one to six carbon atoms, each of the groups $A_3$ and $A_4$ is a direct bond between the imino-nitrogen atom and one of the bridge carbon atoms $C_1$ and $C_2$, or each of these groups stands for an alkylene radical, which links the $C_1$-carbon atom or the $C_2$-carbon atom with the imino-nitrogen atom and has from one to four carbon atoms and $R_1$ and $R_2$ stand for hydrogen or a lower aliphatic hydrocarbon residue with the proviso that whenever the carbocyclic ring I has from three to five atoms as ring members, the azacyclic ring II has at least five atoms as ring members. The carbon atoms of the alkylene radicals $A_1$, $A_2$, $A_3$ and $A_4$ may be arranged in a straight or branched carbon chain.

Apart from the guanidino-lower alkyl substituent attached to the imino nitrogen atom, the N,N-bicycloalkylene ring system may be unsubstituted or may contain additional substituents attached to carbon atoms; such substituents are primarily lower alkyl, especially methyl, as well as ethyl, n-propyl, isopropyl, tertiary butyl and the like.

The N,N-bicycloalkylene-imino radical is represented primarily by the formula:

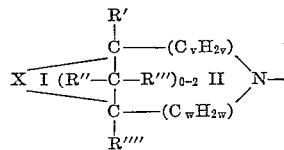

in which each of the groups R', R", R''' and R'''' stands for hydrogen or methyl, the group X is 1,2-ethylene, 1,3-propylene, 1,4-butylene, 1,2-ethenylene, 1,3-propenylene, 1,4-buta-2-enylene or 1,4-buta-1,3-dienylene, and each of the letters $v$ and $w$ stands for an integer from 0 to 3, with the proviso that the carbocyclic ring I and the aza-cyclic ring II both have at least five atoms as ring members.

N,N-bicycloalkylene-imino radicals of the above type are represented, for example by 3-aza-3-bicyclo[3,2,0]heptyl,
7-aza-7-bicyclo[4,1,0]heptyl,
2-aza-2-bicyclo[2,2,1]heptyl,
6-aza-6-bicyclo[3,1,1]heptyl,
7-aza-7-bicyclo[2,2,1]heptyl,
3-aza-3-bicyclo[3,3,0]octyl,
2-aza-2-bicyclo[2,2,2,]octyl (or 2-isoquinuclidinyl),
2-aza-2-bicyclo[3,2,1]octyl,
3-aza-3-bicyclo[3,2,1]octyl,
1,8,8-trimetyl-3-aza-3-bicyclo[3,2,1]octyl,
6-aza-6-bicyclo[3,2,1]octyl,
2-aza-2-bicyclo[4,3,0]nonyl,
3-aza-3-bicyclo[4,3,0]nonyl,
7-aza-7-bicyclo[4,3,0]nonyl (or 4,5,6,7,8,9-hexahydro-1-indolinyl),
8-aza-8-bicyclo[4,3,0]nonyl (or 4,5,6,7,8,9-hexahydro-2-isoindolinyl),
2-aza-2-bicyclo[3,3,1]nonyl,
3-aza-3-bicyclo[3,3,1]nonyl,
2-aza-2-bicyclo[3,2,2]nonyl,
2-aza-3-bicyclo[3,2,2]nonyl,
2,aza-2-bicyclo[4,4,0]decyl (or 1,2,3,4,5,6,7,8,9,10-decahydro-1-quinolyl),
3-aza-3-bicyclo[4,4,0]decyl (or 1,2,3,4,5,6,7,8,9,10-decahydro-2-isoquinolyl),
4-methyl-3-aza-3-bicyclo[4,4,0]decyl,
10-aza-10-bicyclo[4,3,1]decyl,
8-aza-8-bicyclo[4,3,1]decyl,
2-aza-2-bicyclo[5,4,0]undecyl,
4-aza-4-bicyclo[5,4,0]undecyl (or 2,3,4,5,6,7,8,9,10,11-decahydro-1H-3-benzazepinyl), and the like, as well as
7-aza-7-bicyclo[4,3,0]nona-3-enyl (or 4,7,8,9-tetrahydro-1-indolinyl),
8-aza-8-bicyclo[4,3,0]nona-3-enyl (or 4,7,8,9-tetrahydro-2-isoindolinyl),
7-aza-7-bicyclo[4,4,0]deca-3-enyl (or 1,2,3,4,5,8,9,10-octahydro-1-quinolyl),
8-aza-8-bicyclo[4,4,0]deca-3-enyl (or 1,2,3,4,5,8,9,10-octahydro-2-isoquinolyl),
3-aza-3-bicyclo[3,2,1]octa-6-enyl,
9-aza-9-bicyclo[3,2,1]nona-2,4-dienyl and the like.

The lower alkyl radical, linking the imino-nitrogen atom of the N,N-bicycloalkylene-imino portion with the guanidino group, is represented by a lower alkylene radical having from one to seven carbon atoms. Preferably, this radical has from two or three carbon atoms, which separate the imino-nitrogen atom of the N,N-bicycloalkylene-imino portion from the guanidino group by the same number of carbon atoms. Preferred alkylene radicals are 1,2-ethylene, 1,2-propylene, 2,3-propylene or 1,3-propylene; others are, for example, methylene, 1,1-ethylene, 2,3-butylene, 1,3-butylene, 1,4-butylene, 1,4-pentylene, 1,5-pentylene and the like.

The quanidino group is represented by the formula:

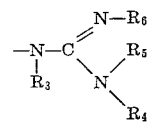

in which each of the radicals $R_3$, $R_4$, $R_5$ and $R_6$ stands primarily for hydrogen. They may also represent aliphatic hydrocarbon groups, particularly lower alkyl, e.g. methyl, ethyl, n-propyl, isopropyl and the like, with the proviso that at least one of the radicals $R_4$, $R_5$ and $R_6$ stands for hydrogen. One of the radicals $R_5$ and $R_6$ may also be an acyl radical; such acyl radical is primarily the acyl radical of an organic acid having from one to twenty carbon atoms, such as the acyl radical of a lower aliphatic monocarboxylic acid, particularly a lower alkane monocarboxylic acid, e.g. formic, acetic, propionic, pivalic, 2,2-dimethyl-butyric acid and the like, as well as a lower alkene monocarboxylic acid, e.g. 3-butene carboxylic acid and the like, a hydroxy-lower alkene monocarboxylic acid, e.g. glycolic, lactic acid and the like, a lower alkoxy-lower alkane monocarboxylic acid, e.g. methoxy-acetic, ethoxy-acetic acid and the like, a lower alkanoyl-lower alkane monocarboxylic acid, e.g. pyruvic acid and the like, a halogeno-lower alkane monocarboxylic acid, e.g. trifluoroacetic, chloroacetic, dichloroacetic, trichloroacetic, bromoacetic acid and the like, a lower aliphatic dicarboxylic acid, for example, a lower alkane dicarboxylic acid, e.g. oxalic, malonic, succinic, methylsuccinic, dimethylsuccinic, glutaric, α-methylglutaric, α,α-dimethylglutaric, β-methylglutaric acid and the like, a lower alkane dicarboxylic acid half ester with a lower alkanol, e.g. succinic acid monomethyl ester, glutaric acid monoethylester and the like, a lower alkene dicarboxylic acid, e.g. itaconic, homoitaconic, maleic, citraconic, homocitraconic, pyrocinchonic, xeronic, fumaric acid and the like, a lower alkene dicarboxylic acid half ester with a lower alkanol, e.g. maleic acid monoethyl ester and the like, a hydroxy-lower alkane dicarboxylic acid, e.g. malic, tartaric acid and the like, as well as the optically active forms thereof, a lower alkoxy-lower alkane dicarboxylic acid, e.g. α,β-dimethoxysuccinic acid and the like, a lower alkoxy-lower alkene dicarboxylic acid, e.g. ethoxy-maleic acid and the like, a halogeno-lower alkane dicarboxylic acid, e.g. chlorosuccinic, bromosuccinic acid and the like, a lower aliphatic tricarboxylic acid, for example, a lower alkane tricarboxylic acid, e.g. tricarballylic acid and the like, a lower alkene tricarboxylic acid, e.g. aconitic acid and the like, a hydroxy-lower alkane tricarboxylic acid, e.g. citric acid and the like, a cycloaliphatic monocarboxylic acid, such as a cycloalkane monocarboxylic acid, in which cycloalkane has from five to six carbon atoms as ring members, e.g. cyclohexane carboxylic acid and the like, a cycloaliphatic dicarboxylic acid, such as a cycloalkene dicarboxylic acid, in which cycloalkene has from five to six carbon atoms as ring members, e.g. tetrahydrophthalic acid and the like, a cycloaliphatic-aliphatic monocarboxylic acid, such as cycloalkyl-lower alkane monocarboxylic acid, in which cycloalkane has from five to six carbon atoms as ring members, e.g. β-cyclopentylpropionic, cyclohexylacetic acid and the like, a monocyclic or bicyclic carbocyclic aryl carboxylic or carbocyclic arylaliphatic carboxylic acid, e.g. benzoic, dihydro-cinnamic, cinnamic, mandelic, salicylic, 4-aminosalicylic, 2-phenoxy-benzoic, 2-acetoxybenzoic acid and the like, or a monocyclic or bicyclic carbocyclic aryl-dicarboxylic acid, e.g. phthalic acid and the like, a monocyclic or bicyclic heterocyclic aryl carbocyclic acid, e.g. nicotinic, isonicotinic, 6-quinoline carboxylic, thienoic, furoic acid and the like, or any other suitable carboxylic acid, such as an amino carboxylic acid, e.g. methionine, tryptophane, lysine, arginine, aspartic, glutamic, hydroxyglutamic acid and the like. Acyl may also stand for the acyl radical of an organic sulfonic acid, such as a lower alkene sulfonic acid, e.g. methane sulfonic, ethane sulfonic acid and the like, a lower hydroxy-alkane sulfonic acid, e.g. 2-hydroxyethane sulfonic acid and the like, a carbocyclic aryl sulfonic acid, such as a monocyclic carbocyclic aryl sulfonic acid, e.g. p-toluene sulfonic acid and the like.

Salts of the new compounds of this invention are particularly pharmaceutically acceptable, non-toxic acid addition salts, especially those with inorganic acids, e.g. hydrochloric, hydrobromic, sulfuric, phosphoric acids and the like, or those with organic acids, especially wtih organic carboxylic or organic sulfonic acids having from one to twenty carbon atoms, such as with those described above furnishing an acyl radical, e.g. acetic, propionic, oxalic, malonic, succinic, glutaric, maleic, malic, tartaric, citric, benzoic, salicylic, acetylsalicyclic, methane sulfonic, ethane sulfonic, 2-hydroxy-ethane sulfonic, ethane 1,2-disulfonic, p-toluene sulfonic acid and the like.

The guanidine compounds of this invention may also form quaternary ammonium compounds, particularly those with a lower alkyl halide, e.g. methyl, ethyl, propyl or isopropyl chloride, bromide or iodide and the like, with a di-lower alkyl sulfate, e.g. dimethyl sulfate, diethyl sulfate and the like, with a lower alkyl lower alkane sulfonate, e.g. methyl or ethyl methane sulfonate or ethane sulfonate and the like, a lower alkyl carboxylic aryl sulfonate, e.g. methyl p-toluene sulfonate and the like, or any other suitable reactive ester of an alcohol with a strong acid. Also included are the corresponding quaternary ammonium salts, in which the anion is derived from an inorganic acid other than hydrohalic or sulfuric acids, or an organic carboxylic acid, such as one of those furnishing the acyl radical previously mentioned.

The new compounds of this invention reduce the norepinephrine content of peripheral sympathetic nerves or interefere with the release of norpinephrine from peripheral sympathetic nerves, and thus cause a reduction of the hypertensive effect resulting from sympathetic nerve stimulation. In view of these antihypertensive properties, the new compounds can be used as antihypertensive agents to relieve hypertensive conditions, particularly those of neurogenic nature. In addition, the compounds of the present invention are useful as antiparasitic, preferably antiprotozoic and anthelmintic agents. For example, they have activity versus trypansomes, pinworms or tapeworms, such as *Trypanosoma cruzi, Aspicularis tetraptera* or *Hymenolepis nana*.

Particularly outstanding antihypertensive properties are exhibited by the compounds of the formulae:

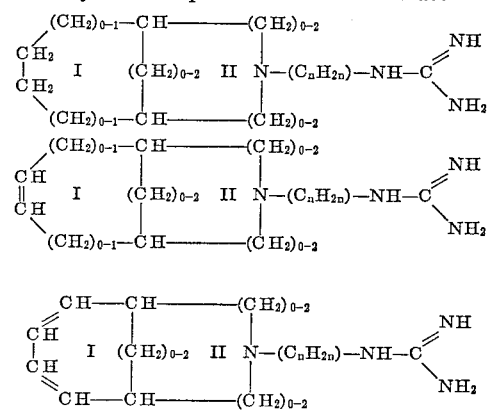

in which the letter $n$ is an integer from 2 to 3, and with the proviso that both the carbocyclic ring I and the azacyclic ring II have at least five atoms as ring members, and the pharmaceutically acceptable, non-toxic acid addition salts, particularly with mineral acids, e.g. sulfuric, hydrochloric acid and the like.

The compounds of this invention may be used in the form of pharmaceutical preparations for enteral or parenteral use, which contain the new compounds, particularly the salts thereof in admixture with a pharmaceutical organic or inorganic, solid or liquid carrier. For making up the preparations there can be employed substances which do not react with the new compounds, such as water, gelatine, lactose, starches, stearic acid, magnesium stearate, stearyl alcohol, talc, vegetable oils, benzyl alcohol, gums, propylene glycol, polyalkylene glycols, petroleum jelly or any other known carrier for pharmaceutical preparations. The latter may be in solid form, for example, as tablets, dragees, capsules and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They also may contain, in combination, other useful substances.

The new guanidine compounds of this invention may be prepared by converting in an (N,N-bicycloalkylene-imino)-lower alkyl-amine, in which N,N-bicycloalkylene-imino have the above-given meaning, or a salt thereof, the amino group into a guanidino group and, if desired, converting a resulting salt into the free compound or into another salt, and/or, if desired, converting a resulting compound into its acyl derivative, and/or, if desired, converting a free compound into a salt or a quaternary ammonium compound thereof, and/or, if desired, converting a quaternary ammonium compound into another quaternary ammonium compound.

Suitable reagents for the conversion of an amino group into a guanidino group are above all S-lower alkyl-isothioureas, as well as O-lower alkyl-isoureas having the formula:

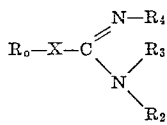

in which $R_2$, $R_3$ and $R_4$ have the previously given meaning, with the proviso that at least one of the radicals $R_2$, $R_3$ and $R_4$ is hydrogen, X is primarily sulfur, as well as oxygen, and $R_0$ stands for lower alkyl, above all methyl, as well as ethyl, n-propyl, isopropyl and the like, and acid addition salts thereof. Salts are employed in preference over the free compounds and are primarily those with mineral acids, especially sulfuric acid, as well as hydrochloric, hydrobromic acid and the like. The preferred reagents are the S-methyl-isothiourea and the mineral acid addition salts thereof; S-methyl-isothiourea sulfate is the reagent of choice to form guanidine compounds having an unsubstituted guanidino group. These reagents are known, or, if new, may be prepared according to known methods; for example, they may be obtained by alkylating thioureas or ureas, in which at least one of the nitrogen atoms carries a hydrogen atom, with a lower alkyl halide, e.g. methyl or ethyl chloride, bromide or iodide and the like, or with a di-lower alkyl-sulfate, e.g. dimethyl sulfate, diethyl sulfate and the like.

The N,N - bicycloalkylene - imino - lower alkyl - amines used as the starting material, in which the amino group is above all an unsubstituted amino group, but may also represent a monosubstituted amino group, such as an N-lower alkyl-amino group, e.g. N-methylamino, N-ethylamino and the like, is generally used in the form of its free base.

The reaction is carried out by contacting the starting material with the reagent, preferably in the presence of a solvent, the choice of which depends primarily on the solubility of the reactants. Water or water-miscible organic solvents, such as lower alkanols, e.g. methanol, ethanol, propanol, isopropanol, tertiary butanol and the like, ethers, e.g. diethyleneglycol dimethylether, p-dioxane, tetrahydrofuran and the like, ketones, e.g. acetone, ethyl methyl ketone and the like, formamides, e.g. formamide, N.N-dimethylformamide and the like, or aqueous mixtures of such solvents are preferred diluents. The reaction may be carried out at room temperature, but is preferably completed at an elevated temperature, and, if necessary, in the atmosphere of an inert gas, e.g. nitrogen, and/or, in a closed vessel.

Other reagents capable of transforming the amino group of an (N,N-bicycloalkylene-imino)-lower alkyl- amine, particularly of an acid addition salt of such compound, are cyanamides having the formula:

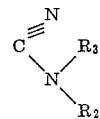

The reaction may be carried out, for example, by heating a mixture of the cyanamide with an acid addition salt, particularly a mineral acid addition salt thereof, such as the hydrochloride, hydrobromide, sulfate and the like, of an (N,N-bicycloalkylene-imino)-lower alkyl-amine. A resulting melt may then be dissolved in a solvent, such as a lower alkanoic acid, e.g. acetic acid, and the like, and the desired product may be isolated, for example, by crystallization and the like. The reaction may also be performed in the presence of a suitable solvent, such as a lower alkanol, e.g. ethanol and the like. The salt used as the starting material may be formed at the site of the reaction by performing the latter in the presence of an acid, particularly of a concentrated aqueous mineral acid, e.g. hydrochloric acid and the like. Alternatively, the cyanamide reagent may also be formed in situ; for example. 1-nitroso-3-methyl-guanidine furnishes the N-methyl-cyanamide in the course of the reaction, which then reacts with the amine to form the desired guanidino compound. The reaction may proceed exothermically, and, if necessary, may be maintained by heating, for example, to from about 80° to about 200°; the atmosphere of an inert gas, e.g. nitrogen, may be advantageous.

A third modification of the general procedure for the manufacture of the compounds of this invention comprises reacting an (N,N-bicycloalkylene-imino)-lower alkyl-amine with a salt of a 1-guanyl-pyrazole. A salt of 1-guanyl-pyrazole is primarily a salt with a mineral acid, such as, for example, nitric acid; the pyrazole nucleus of such reagent may contain additional substituents, particularly lower alkyl, e.g. methyl, ethyl and the like. Salts of 1-guanyl-3,5-dimethyl-pyrazole, particularly the nitrate thereof, represent the preferred reagents. The reaction may be carried out in the absence of a solvent, for example, by fusing the two reactants, or in the presence of a diluent, such as, for example, a lower alkanol, e.g. ethanol and the like; advantageously, contact with carbon dioxide should be avoided, for example, by performing the reaction in the atmosphere of an inert gas, e.g. nitrogen. The reaction mixture is preferably heated, for example, to the melting point of the mixture or to the boiling point of the solvent.

The (N,N-bicycloalkylene-imino)-lower alkyl-amines and salts thereof, used as the starting materials, are known, or, if new, may be prepared according to known procedures. They may be obtained for example, by treating an N.N-bicycloalkylene-imine with a halogeno-lower alkyl-nitrile, in which halogeno represents, for example, chloro, bromo and the like, or with a lower alkene-nitrile, in which the double bond is activated by the nitrile group, that it adds to the imino group, and converting a resulting (N,N-bicycloalkylene-imino)-lower alkyl-nitrile, the nitrile portion into a methylene-amino group by reduction. The latter may be carried out, for example, by catalytic hydrogenation, such as, treatment with hydrogen in the presence of a catalyst containing a metal of the eight group of the Periodic System, e.g. palladium on charcoal, Raney nickel and the like, or by treatment with a light metal hydride, for example, an aluminum hydride, such as lithium aluminum hydride, sodium aluminum hydride, magnesium aluminum hydride, aluminium borohydride, aluminum hydride and the like, which reagents may be used, if desired, in the presence of an activator, such as aluminum chloride and the like.

The compounds of the present invention may also be prepared by converting in an (N,N-bicycloalkylene-imino)-lower alkyl-amine, in which the amino group carries a substituent capable of being converted into an amidino group, or a salt thereof, such substituent into an amidino group, and, if desired, carrying out the optional steps.

Depending on the character of the substituent attached to the amino group of the starting material, the procedure outlined hereinabove is carried out according to different modifications.

For example, the substituent of the amino group may contain a carbon atom, which is attached to the nitrogen atom of the amino group of the starting material, i.e. the (N,N-bicycloalkylene-imino)-lower alkyl-amine; to this carbon atom may be connected a nitrogen atom, and said carbon atom may carry an additional nitrogen atom, as well as other hetero atoms, such as, for example, oxygen or sulfur. Substituents attached to the amino group of the starting material may be represented, for example, by cyano of the formula —C≡N, carbamyl of the formula —CONR$_2$(R$_3$), thiocarbamyl of the formula

—CSNR$_2$(R$_3$)

lower alkoxy-(imino)methyl of the formula

—C(=NR$_4$)—OR$_o$ in which R$_o$ is lower alkyl, primarily methyl, as well as ethyl and the like, lower alkyl-mercapto-(imino)methyl of the formula —C(=NR$_4$)—SR$_o$, in which R$_o$ has the above-given meaning, cyanoamidino of the formula —C(=NR$_4$)—N(R$_2$)—C≡N, guanidino-(imino) methyl of the formula

—C(=NR$_4$)—[N(R$_2$)—C(=NH)—NH$_2$]

isocyano-(imino)methyl of the formula

—C(=NR$_4$)—N=C=O or isothiocyano-(imino)methyl of the formula

—C(=NR$_4$)—N=C=S and the like, in which R$_2$, R$_3$ and R$_4$ have the previously given meaning, but stand particularly for hydrogen.

Together with the (N,N-bicycloalkylene-imino)-lower alkyl-amino portion, these substituents form cyanamide, urea, thiourea, O-lower alkyl-isourea, S-lower alkyl-isothiourea, cyanoguanidine, biguanide, cyanourea or cyanothiourea derivatives and the like. All of these compounds have the above-given characteristic, i.e. to the amino group is attached a carbon atom, which carries at least one nitrogen atom, apart from other nitrogen or hetero atoms.

The majority of these starting materials are converted into the desired guanidino derivatives by ammonolysis or aminolysis.

For example, a cyanamide compound may be converted into a guanidino derivative by treatment with ammonia or an ammonia-furnishing reagent, as well as with an amine. This reaction is carried out, for example, by treating the cyanamide compound with liquid ammonia under pressure and at an elevated temperature, if desired, in the presence of an anion capable of forming a stable salt with a resulting guanidine; ammonium acetate, ammonium sulfate, ammonium chloride and the like may be used as anion sources. Ammonia may be replaced by ammonia furnishing ammonium salts; such salts are, for example, ammonium monohydrogen phosphate, which may be used under pressure and at an elevated temperature, or ammonium nitrate, whereby a salt, such as, for example, an alkaline earth metal, e.g. calcium and the like, salt or an alkali metal, e.g. sodium, potassium and the like, salt of the cyanamide starting material is preferably used, which may be reacted with the ammonium nitrate in the presence of catalytic amounts of water.

The cyanamide compounds, used as intermediates and salts thereof, may be prepared, for example, by treating an (N,N-bicycloalkylene-imino)-lower alkyl-amine with a cyanogen halide, e.g. cyanogen chloride, cyanogen bromide and the like, advantageously used in equivalent amounts, and preferably in an inert solvent, such as, for example, diethylether and the like.

A carbamyl substituent attached to the amino group of an (N,N-bicycloalkylene-imino)-lower alkyl-amine may be converted into the desired amidino group by treatment with ammonia, preferably, in the presence of a dehydrating agent, such as, for example, phosphorus pentoxide and the like. This reaction may be carried out at an elevated temperature in a closed vessel; temperature and pressure may be reduced in the presence of a non-aqueous solvent and/or of a reaction accelerator, such as finely dispersed nickel, aluminum, aluminum oxide and the like. Ammonia may be replaced by an amine to form in the final product a substituted guanidino group.

Furthermore, a thiocarbamyl group, which together with the amino group of an (N,N-bicycloalkylene-imino)-lower alkyl-amine forms a thiourea group, may be converted into an amidino group by treatment with ammonia, for example, in the presence of water, and/or of a non-hydrolytic solvent, such as, for example, toluene and the like, and in the presence of a desulfurizing agent. The latter is selected advantageously from basic oxides, basic carbonates and the like, of heavy metals, such as lead, zinc, cadmium, tin, mercury and the like; suitable desulfurizing compounds are, for example, lead oxide, mercuric oxide, lead hydrogen carbonate and the like; mercuric chloride may also be used. The ammonolysis of the thiourea compounds is preferably carried out at an elevated temperature, and, if necessary, in a closed vessel, primarily to avoid loss of ammonia. An amine may replace ammonia to form N-substituted guanidino derivatives.

Ureas and thioureas, used as the starting material in the above-mentioned modification of the procedure of this invention or salts thereof may be obtained, for example, from (N,N-bicycloalkylene-imino)-lower alkyl-amines by treating the latter with ammonium or metal cyanates, or thiocyanates, such as alkali metal, e.g. sodium, potassium and the like, cyanates or thiocyanates. These reagents are preferably used in the presence of a solvent, for example, water, if desired, containing a small amount of an acid, such as a mineral acid, e.g. hydrochloric, sulfuric acid and the like. This procedure furnishes ureas or thioureas of the above-given formula, in which R$_4$ stands for hydrogen. Organic isocyanates or organic isothiocayanates, when reacted with the (N,N-bicycloalkylene-imino)-lower alkyl-amines yield N-substituted ureas or thioureas; the organic lower alkyl isocyanates and organic isothiocyanates are reacted with the amino compound in a solvent, such as, for example, a lower alkanol, e.g. methanol, ethanol and the like.

The above-mentioned urea or thiourea compounds, used as starting materials, may also be obtained by ammonolysis or aminolysis of reactive functional derivatives of N-(N,N-bicycloalkylene-imino)-lower alkane carbamic acids as well as N-(N,N-bicycloalkylene-imino)-lower alkane thiocarbamic acids. Such reactive functional derivatives are primarily esters, for example, lower alkyl, e.g. methyl, ethyl and the like, esters or halides, e.g. chlorides and the like. Upon ammonolysis, for example, by treatment with ammonia, if necessary, at an elevated temperature in a closed vessel, these carbamic and thiocarbamic acids yield the desired urea or thiourea derivatives, respectively. Ammonia may also be replaced by an amine.

The group of N-(N,N-bicycloalkylene-imino)-lower alkyl-O-lower alkyl-isoureas and N-(N,N-bicycloalkylene-imino)-lower alkyl-S-lower alkyl-isothioureas and salts thereof, are compounds containing the previously mentioned O-lower alkoxy-(imino)methyl group of the formula —C(=NR$_4$)—OR$_o$ and S-lower alkyl-mercapto-(imino)methyl group of the formula —C(=NR$_4$)—SR$_o$, respectively, in which R$_4$ and R$_o$ have the previously given meaning; these compounds are, therefore, useful as starting materials in the preparation of the compounds of this invention. They may be converted into the latter, for example, by ammonolysis or aminolysis. Ammonolysis may be carried out by treatment with ammonia, either in its liquid form or as a solution, such as an aqueous solution, thereof, whereby an elevated temperature and/ or a closed vessel, as well as the presence of an ammonium salt, such as ammonium chloride and the like, may be required. If necessary, dehydrating agents or desulfurizing agents, such as those previously described, may be present in the reaction medium, depending on the type of starting material used. An amine may also be used for the conversion of the isoureas and isothioureas into guanidino derivatives having substituted guanidino groups.

The isourea and isothiourea compounds used as the starting materials in the above reaction may be obtained, for example, from the previously mentioned urea and thiourea derivatives by treatment of the latter, or of a metal salt thereof, such as an alkali metal, e.g. sodium, potassium and the like, salt thereof, with a lower alkyl halide, e.g. methyl or ethyl chloride, bromide or iodide and the like, or with a di-lower alkyl sulfate, e.g. dimethyl sulfate, diethyl sulfate and the like. Such reaction may be carried out in the presence of a solvent, the selection of which depends on the type of reagents used; a free urea or thiourea compound may be used in the presence of water or a lower alkanol, e.g. methanol, ethanol and the like, whereas an alkali metal salt of an urea or thiourea compound may be reacted in the presence of a hydrocarbon, e.g. toluene and the like, solution.

A cyanamidino substituent, which forms a cyanoguanidino group with the amino group of an (N,N-bicycloalkylene-imino)-lower alkyl-amine, may be converted into an amidino group by ammonolysis or aminolysis. This reaction may be carried out, for example, by treatment with ammonia, as well as with an ammonium salt, e.g. ammonium chloride, ammonium nitrate, ammonium sulfate and the like, whereby these salts may also promote ammonolysis with ammonia itself. Aminolysis of the starting materials may be carried out by treatment with an amine and N-substituted guanidine derivatives may be obtained.

In the ammonolysis procedure of a cyanoguanidino to a guanidino derivative as described hereinabove, a biguanido group may be formed intermediarily, which, upon further treatment with the ammonolysis reagent, may be converted to the desired guanidino group. The intermediate biguanido derivatives are also accessible through different procedures (as will be shown hereinbelow) and are, therefore, useful as starting materials for the formation of the desired guanidino compounds by treatment with one of the ammonolysis or aminolysis reagents described hereinbefore.

A cyano-guanidino derivative, as mentioned above, may also be converted into the desired guanidino compound by reductive cleavage of the cyano group; the cleavage may be carried out, for example, by electrolytic reduction on a cathode, such as, for example, a lead cathode.

The above cyano-guanidino derivatives and their salts may be prepared by treatment of an N-(N,N-bicycloalkylene-imino)-S-lower alkyl-cyano-isothiourea with ammonia, for example, in the presence of a lower alkanol, e.g. ethanol and the like, preferably in a sealed tube, or with an amine.

In view of the fact that the previously described cyanoguanidine derivatives are formed by ammonolysis or aminolysis from S-lower alkyl-cyanoisothiourea compounds, starting materials for the preparation of the guanidino compounds of this invention. Ammonolysis or aminolysis of the cyanoisothiourea compounds to the latter may be carried out by treatment with ammonia of an amine in the presence of an anion of a strong acid, such as a halide, a nitrate, a sulfate ion and the like, for example, by the respective ammonium salts.

The S-lower alkyl-cyanoisothioureas or their salts may be obtained, for example, by treating an (N,N-bicycloalkylene-imino)-lower alkyl-isothiocyanate with an alkali metal, e.g. sodium, cyanamide and alkylating a resulting 1-[(N,N-bicycloalkylene-imino)-lower alkyl]-3-cyano-2-thiourea, preferably a salt thereof, with a lower alkyl halide, e.g. methyl or ethyl chloride, bromide or iodide and the like, or with a di-lower alkyl sulfate, e.g. dimethyl sulfate, diethyl sulfate and the like.

As has been shown, ammonolysis of cyano-guanidines may give rise to the formation of N-(N,N-bicycloalkylene-imino)-lower alkyl biguanido compounds and salts thereof. These compounds may also be prepared, for example, by reacting an (N,N-bicycloalkylene-imino)-lower alkyl-amine with dicyanodiamide, preferably in the presence of a complex metal-forming salt, e.g. copper sulfate and the like. A resulting biguanido complex metal salt, such as the copper complex salt thereof, may be liberated to yield the free compound by treatment with an acid, such as a mineral acid, e.g. sulfuric acid and the like. As previously described, ammonolysis and aminolysis of these biguanido derivatives rise to the formation of the desired guanidines of this invention.

In addition to ammonolysis and aminolysis, the new guanidino compounds may also be obtained by hydrolysis of an (N,N-bicycloalkylene-imino)-lower alkyl-amine, in which the amino group carries a substituent capable of being hydrolyzed to an amidino group. For example, such substituent forms together with the amino group of the (N,N-bicycloalkylene-imino)-lower alkyl-amine, a cyanourea or a cyanothiourea group of the formulae —N(—CN)—CO—NH$_2$ and —N(—CN)—CS—NH$_2$, respectively, or their tautomers. Compounds containing such groups yield upon treatment with a hydrolytic reagent, particularly with a dilute mineral acid, such as aqueous sulfuric acid and the like, the desired guanidino compounds. In such a hydrolysis reaction, the desired guanidine derivative may be formed simultaneously with a biuret derivative as the by-product.

Cyanourea or cyanothiourea compounds of the above type and salts thereof, which may be converted to the desired guanidino compounds by hydrolysis, may be obtained, for example, by reacting an (N,N-bicycloalkylene-imino)-lower alkyl-cyanamide with a metal cyanate or thiocyanate, particularly an alkali metal, e.g. sodium or potassium, cyanate or thiocyanate in a neutral medium, for example, in the presence of water.

Apart from (N,N-bicycloalkylene-imino)-lower alkyl-amines, in which the amino group is substituted by a carbon atom carrying a nitrogen atom, other (N,N-bicycloalkylene-imino)-lower alkyl-amines, in which the amino group carries a substituent convertible into an amidino group, may be useful for the conversion into the desired (N,N-bicyclo alkylene-imino)-lower alkyl-guanidines of this invention. In such conversion intermediates may be formed, which may have the previously given characteristics, i.e. the amino group carries a carbon with a nitrogen atom attached thereto. Suitable groups attached to the amino group are, for example, ester groups, formed by a carboxyl, a thionocarboxyl, a thiolocarboxyl or a dithiocarboxy group with a lower alkanol, as well as halogeno-carbonyl or halogeno-thiocarbonyl groups, in which halogeno represents primarily chloro.

Particularly useful starting materials are, for example, the reactive functional derivatives of N-(N,N-bicycloalkylene-imino)-lower alkyl-carbamic acids and N-(N,N-bicycloalkylene-imino)-lower alkyl-thiocarbamic acids or salts thereof. As shown hereinabove, esters, for example, lower alkyl, e.g. methyl, ethyl and the like, esters or halides, e.g. chlorides, of such acids yield upon ammonolysis the corresponding urea and thiourea derivatives. However, if, for example, the ammonolysis of a carbamic acid ester is carried out in the presence of one of the previously shown dehydrating agents, an N-(N,N-bicycloalkylene-imino)-lower alkyl-carbamic acid ester may be converted directly to the desired guanidino compound. Or, an ester of an N-(N,N-bicycloalkylene-imino)-lower alkyl-thiocarbamic acid may be subjected to ammonolysis to yield directly the desired guanidino compound, for example, in the presence of one of the previously described desulfurizing reagents, e.g. lead oxide and the like.

The carbamic and thiocarbamic acid derivatives used as the starting materials may be prepared according to known methods. For example, upon treatment of an (N,N - bicycloalkylene - imino) - lower alkyl-amine with phosgene or thiophosgene, which reagents may be used in a slight excess over the amines, the (N,N-bicycloalkylene-imino)-lower alkyl-isocyanates and (N,N-bicycloalkylene-imino)-lower alkyl-isothiocyanates, respectively, may be formed. Such cyanate and isothiocyanate compounds may then be converted into esters of carbamic or thiocarbamic acids by treatment with an alcohol, for example, a lower alkanol, e.g. methanol, ethanol and the like, or into the corresponding thiol-esters, by treatment with a mercaptan, such as a lower alkylmercaptan, e.g. methylmercaptan, ethyl mercaptan and the like. The above derivatives may also be obtained by reacting an (N,N-bicycloalkylene-imino)-lower alkyl-amine with a carbonic acid lower alkyl ester, or, particularly a dithio-carbonic acid lower alkyl ester, as well as with a lower alkyl ester of a halogenoformic acid, such as chloroformic acid, or, primarily, of a halogeno-thioformic acid, such as chloro-thioformic acid.

Or, a salt of an (N,N-bicycloalkylene-imino)-lower alkyl amine, particularly a hydrohalide, e.g. hydrochloride, thereof, when reacted with phosgene or thiophosgene at an elevated temperature, preferably in a closed vessel, yields the desired N-(N,N-bicycloalkylene-imino)-lower alkyl-carbamic acid chloride, and the N-(N,N-bicycloalkylene-imino) - lower alkyl - thiocarbamic acid chloride, respectively.

The (N,N-bicycloalkylene-imino)-lower alkyl-amines, which are used in many of the above instances to manufacture the starting materials in the procedure of the invention, are known or if new may be prepared, for example, according to the previously shown procedure.

In the products obtained according to the above-described methods, additional groups may be introduced or groups may be exchanged for other substituents. For example, resulting compounds having a guanidino group of the formula:

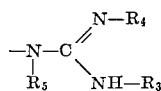

may be acylated to form compounds having a guanidino group of the formulae:

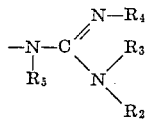

in which $R_3$, $R_4$ and $R_5$ have the previously given meaning, and $R_2$ is an acyl radical. Such reaction may be carried out, for example, by treating the guanidine compound with a reactive derivative of an acid, for example, with the halide, e.g. chloride and the like, or the anhydride of a carboxylic acid. Acylation may be performed in the presence of an inert solvent, for example, a hydrocarbon, such as a lower alkane, e.g. hexane and the like, a monocyclic carboxylic aryl hydrocarbon, e.g. benzene, toluene, xylene and the like, or in a tertiary organic base, such as a liquid pyridine compound, e.g. pyridine, collidine and the like, or any other suitable diluent. Acylation may also be achieved in the absence of a solvent, for example, by heating the guanidine compound or a salt thereof with the acylating reagent, for example, acetic acid anhydride and the like, in a sealed tube.

A resulting salt may be converted into the free compound in the customary way, for example, by treatment with a strong alkaline reagent, such as an alkali metal hydroxide, e.g. lithium, sodium, potassium hydroxide and the like, or a strong quaternary ammonium anion (hydroxy ion) exchange preparation and the like.

A resulting salt may be converted into another salt, for example, by treatment with a metal salt of an acid in a suitable solvent or with a suitable anion exchange preparation.

A free compound may be transformed into a salt thereof by reacting it with an appropriate acid, preferably in a solvent or mixture of solvents, and isolating the desired salt. Mono- or poly-salts may be formed.

Quaternary ammonium derivatives of the compounds of this invention may be obtained by reacting a resulting free compound with one of the previously mentioned lower alkyl halides, di-lower alkyl-sulfates and lower alkyl sulfonates. The quaternizing reaction may be performed in the absence or in the presence of a solvent, if necessary, at an elevated temperature, and/or in a closed vessel and/or in the atmosphere of an inert gas, e.g. nitrogen.

A resulting quaternary ammonium compound may be converted into another quaternary ammonium compound, such as a quaternary ammonium hydroxide, for example, by reacting a quaternary ammonium halide with silver oxide, by treating a quaternary ammonium sulfate with barium hydroxide, or a quaternary ammonium salt with an anion exchange preparation, or by electrodialysis. From a resulting quaternary ammonium hydroxide, there may be formed a quaternary ammonium salt by treating it with an acid. Quaternary ammonium salts may be converted directly into other quaternary ammonium salts, for example, a quaternary ammonium iodide, when reacted with silver chloride or with hydrogen chloride in methanol, yields a quaternary ammonium chloride; a corresponding conversion may also be achieved by treating a quaternary ammonium salt with a suitable anion exchange preparation, for example, with those outlined hereinbefore as being useful for the preparation of acid addition salts.

The invention also comprises any modification of the general process, wherein a compound obtainable as an intermediate at any stage of the process is used as the starting material and the remaining step(s) of the process is(are) carried out; also included within the scope of the invention are any new intermediates.

In the process of this invention such starting materials are preferably used which lead to final products mentioned in the specification as preferred embodiments of the invention.

The following examples illustrate the invention and are not to be construed as being limitations thereon. Temperatures are given in degrees centigrade.

*Example 1*

To a solution of 6.3 g. of 2-(4,5,6,7,8,9-hexahydro-indolinyl)-ethylamine in 7 ml. of water is added 5.38 g. of S-methyl-isothiourea sulfate; the reaction mixture is refluxed for five hours and then cooled. The resulting 2-(4,5,6,7,8,9 - hexahydro-1-indolinyl)-ethyl-guanidine sulfate [or 1-(2-guanidino-ethyl)-4,5,6,7,8,9-hexahydro-indoline sulfate] of the formula:

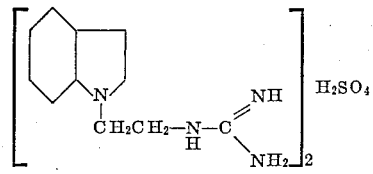

precipitates and is recrystallized from ethanol, M.P. 236–238° (containing one-half mole of water).

The starting material may be prepared as follows: A mixture of 24 g. of indoline and 4.4 g. of calcium oxide in 75 ml. of tetrahydrofuran is hydrogenated in the presence of Raney nickel in a closed vessel at 190–200° and 150 atmospheres pressure. The resulting mixture is filtered, the solvent is removed from the filtrate and the desired 4,5,6,7,8,9-hexahydro-indoline is distilled, B.P. 62–64°/15 mm.; yield: 12.5 g.

A mixture of 18.5 g. of 4,5,6,7,8,9-hexahydro-indoline, 12.2 g. of chloroacetonitrile and 17 g. of anhydrous sodium carbonate in 100 ml. of toluene containing 0.5 ml. of water is refluxed for eight hours while stirring. The dark precipitate is filtered off and washed with toluene, the toluene solutions are combined and the solvent is removed by distillation. The residue is distilled to yield the (4,5,6,7,8,9-hexahydro-1-indoline)-acetonitrile (or 1-cyanomethyl-4,5,6,7,8,9-hexahydro-indolinyl) B.P. 138–146°/27 mm.; yield: 11.7 g.

A solution of 11.7 g. of (4,5,6,7,8,9-hexahydro-1-indolinyl)-acetonitrile in 150 ml. of diethylether is added dropwise to a solution of 6 g. of lithium aluminum hydride in 200 ml. of diethylether over a period of 2½ hours while stirring, cooling in an ice-bath and maintaining an atmosphere of nitrogen. To the cold reaction mixture are added 18 ml. of ethyl acetate, 6 ml. of water, 12 ml. of a 15 percent aqueous solution of sodium hydroxide and 18 ml. of water in this order, and the resulting mixture is filtered. The solid material is washed with diethylether, the organic solvents are evaporated from the filtrate, and the remaining 2-(4,5,6,7,8,9-hexahydro - 1 - indolinyl)-ethylamine [or 1-(2-aminoethyl)-4,5,6,7,8,9-hexahydro-indoline] is distilled, B.P. 112–120°/16 mm.; yield: 6.3 g.

3-(4,5,6,7,8,9-hexahydro-1-indolinyl)-propylamine, obtained from 4,5,6,7,8,9-hexahydro-indoline by treating it with acrylonitrile in the presence of a small amount of benzyl trimethyl ammonium hydroxide and reducing the resulting 3-(4,5,6,7,8,9 - hexahydro - 1 - indolinyl)-propionitrile with lithium aluminum hydride, when reacted with S-methyl-isothiourea sulfate according to the above procedure, yields the 3-(4,5,6,7,8,9 - hexahydro - 1 - indolinyl)-propyl-guanidine sulfate [or 1-(3 - guanidinopropyl)-4,5,6,7,8,9-hexahydro-indoline sulfate].

*Example 2*

A solution of 7.8 g. of 2-(4,5,6,7,8,9-hexahydro-2- isoindolinyl)-ethylamine and 6.4 g. of S-methyl-isothiourea sulfate in 10 ml. of water is refluxed for six hours. The white precipitate formed upon standing is recrystallized from anhydrous ethanol to yield 6.3 g. of 2-(4,5,6,7,8,9-hexahydro-2-isoindolinyl)-ethyl-guanidine sulfate [or 2-(2-guanidinoethyl)-4,5,6,7,8,9-hexahydro-isoindoline sulfate] of the formula:

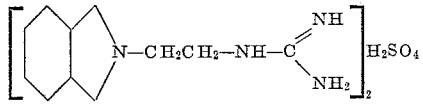

melting at 238–240°.

The starting material may be prepared as follows: A solution of 50 g. of 4,7,8,9-tetrahydro-phthalimide is reduced with 20 g. of lithium aluminum hydride in 800 ml. of diethylether using a soxhlet extraction procedure. After 22 hours of refluxing, the reduction is interrupted, the solvent is evaporated and the residue is distilled to yield 16.5 g. of 4,7,8,9-tetrahydroisoindoline, B.P. 82–92°/14–15 mm.

A solution of 10 g. of 4,7,8,9-tetrahydro-isoindoline in methanol is hydrogenated in the presence of 0.25 g. of platinum oxide at three atmospheres pressure. The catalyst is removed and the filtrate is distilled off to leave 11.8 g. of 4,5,6,7,8,9-hexahydro-isoindoline, which is used without further purification.

A mixture of 11.8 g. of 4,5,6,7,8,9-hexahydro-isoindoline, 6.6 g. of chloroacetonitrile and 20 g. of sodium carbonate in 100 ml. of toluene containing 0.5 ml. of water is refluxed for twelve hours while stirring. The solid material is filtered off, the solvent is distilled from the filtrate under reduced pressure and the residue is distilled to yield 10.7 g. of (4,5,6,7,8,9-hexahydro-2-isoindolinyl)-acetonitrile (or 2-cyanomethyl-4,5,6,7,8,9-hexahydro-isoindoline), B.P. 134–140°/17 mm.

A solution of 10.7 g. of (4,5,6,7,8,9-hexahydro-2-isoindolinyl)-acetonitrile in 200 ml. of diethylether is added to a solution of 4.9 g. of lithium aluminum hydride in diethylether; the reaction mixture is worked up as shown in Example 1 to yield 7.8 g. of the desired 2-(4,5,6,7,8,9-hexahydro-2-isoindolinyl-ethylamine [or 2-(2 - aminoethyl) - 4,5,6,7,8,9 - hexahydro-isoindoline], B.P. 120–125°/16–17 mm.

*Example 3*

A solution of 11.2 g. of 2-(4,7,8,9-tetrahydro-2-isoindolinyl)-ethylamine and 9.3 g. of S-methyl-isothiourea sulfate in 15 ml. of water is refluxed for six hours. After standing over a week and at room temperature, the precipitate is filtered off and recrystallized from anhydrous ethanol to yield 8.5 g. of 2-(4,7,8,9-tetrahydro-2-isoindolinyl)-ethyl-guanidine sulfate [or 2-(2-guanidinoethyl)-4,7,8,9-tetrahydro-isoindoline sulfate] of the formula:

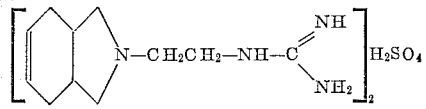

which melts at 222–224°.

From the aqueous filtrate of the reaction mixture, a yellow oil is separated and crystallized from hot ethanol. Upon recrystallization from a mixture of methanol and acetone, there is obtained a material melting at 255–258°, which corresponds to the 2-(4,7,8,9-tetrahydro-2-isoindolinyl)-ethyl-guanidine sulfate of the formula:

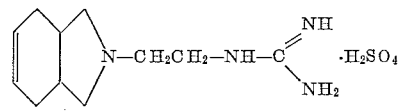

The starting material may be prepared as follows: A mixture of 6.5 g. of 4,7,8,9-tetrahydro-2-isoindoline, 4.4 g. of chloroacetonitrile and 20 g. of sodium carbonate in 100 ml. of toluene containing 0.5 ml. of water is refluxed while stirring for twelve hours. The cold solution is filtered, the solid residue is washed with benzene, and the organic solvents are removed from the filtrate under reduced pressure to yield the (4,7,8,9-tetrahydro-2-isoindolinyl)-acetonitrile (or 2-cyanomethyl-4,7,8,9-tetrahydro-isoindoline), which is distilled at 15 mm. pressure, B.P. 140–148°; yield: 6.5 g.

A solution of 13.4 g. of (4,7,8,9-tetrahydro-2-isoindolinyl)-acetonitrile in 325 ml. of diethylether is reduced with 6.3 g. of lithium aluminum hydride according to the procedure described in Example 1 to yield 11.2 g. of 2-(4,7,8,9-tetrahydro-2-isoindolinyl)-ethylamine [or 2-(2-amino-ethyl)-4,7,8,9-tetrahydro-isoindoline], B.P. 125–128°/14–15 mm.

*Example 4*

A solution of 3.3 g. of 3-(2,3,4,5,6,7,8,9,10,11-decahydro-1H-3-benzazepinyl)-ethyl-amine and 2.4 g. of S-methyl isothiourea sulfate in 4 ml. of water is refluxed for five hours. Acetone is added to the cooled mixture, the solid material is filtered off and recrystallized from a mixture of ethanol and acetone to yield 2-(2,3,4,5,6,7,8,9,10,11 - decahydro - 1H-3-benzazepinyl)-ethyl-guanidine sulfate [or 3-(2-guanidinoethyl)-2,3,4,5,-6,7,8,9,10,11-decahydro-1H-3-benzazepine sulfate] of the formula:

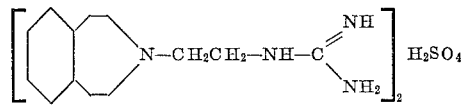

which melts at 197–200° and contains two moles of crystallization water.

The above sulfate salt is suspended in water, an excess of sodium hydroxide is added while cooling and the free base is extracted immediately with chloroform. The chloroform solution is dried, filtered and evaporated. The free base is converted into the dihydrochloride of the formula:

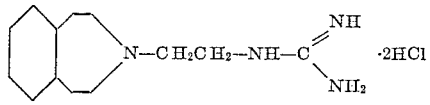

by treating a concentrated solution of the free base in ethanol with a solution of hydrogen chloride in ethanol and diluting the reaction mixture with diethylether. The salt precipitates and melts at 177° (with decomposition) after recrystallization from isopropanol.

The starting material may be prepared as follows: To a solution of 32.2 g. of 2,3,4,5 - tetrahydro - 1H - 3-benzazepine and 23.4 g. N,N,N-triethylamine in 10 ml. of benzene is added while stirring and cooling in an ice-bath a solution of 18 ml. of acetyl chloride in 100 ml. of benzene over a period of one-half hour. The reaction mixture is stirred for an additional 45 minutes while refluxing and stirring. 200 ml. of water is added to the stirred solution, the aqueous layer is separated and extracted twice with benzene. The combined benzene solutions are washed with water, dried over magnesium sulfate, filtered and evaporated under reduced pressure. The residue crystallizes from a mixture of benzene and pentane to yield 30 g. of 3-acetyl-2,3,4,5-tetrahydro-1H-3-benzazepine, M.P. 80–83°.

A mixture of 30 g. of 3-acetyl-2,3,4,5-tetrahydro-1H-3-benzazepine, 20 g. of Raney nickel and 4.4 g. of calcium oxide in 50 ml. of tetrahydrofuran is treated with hydrogen at 200° under 200 atmospheres of pressure for eight hours. The cold mixture is filtered, the solvent is removed from the filtrate under reduced pressure, and the residue is distilled to yield 4.8 g. of 2,3,4,5,6,7,8,9,10,11-decahydro-1H-3-benzazepine, B.P. 36°/0.05 mm. and 19.4 g. of 3-acetyl-2,3,4,5,6,7,8,9,10,11-decahydro-1H-3-benzazepine, B.P. 93–97°/0.05 mm. The latter is refluxed for twelve hours with 100 ml. of concentrated hydrochloric acid; the solvent is removed by distillation and 11 g. of 2,3,4,5,6,7,8,9,10,11 - decahydro - 1H - 3-benzazepine hydrochloride, M.P. 222–225°, is recovered and converted into the free compound by treatment with a base, yield: 7.7 g.

A mixture of 7.7 g. of 2,3,4,5,6,7,8,9,10,11-decahydro-1H-3-benzazepine, 4.2 g. of chloroacetonitrile and 6 g. of sodium carbonate in 60 ml. of toluene containing 0.5 ml. of water is refluxed for eight hours while stirring. After standing overnight the solution is filtered, the residue is washed three times with hot benzene and the filtrate is evaporated. The residue is distilled to yield (2,3,4,5,6,-7,8,9,10,11 - decahydro - 1H-3-benzazepinyl)-acetonitrile (or 3-cyanomethyl-2,3,4,5,6,7,8,9,10,11-decahydro-1H-3-benzazepine), B.P. 160–162°/14 mm.; yield: 4.5 g.

Upon reducing 4.5 g. of (2,3,4,5,6,7,8,9,10,11-decahydro-1H-3-benzazepinyl)-acetonitrile with 1.7 g. of lithium aluminum hydride in 125 ml. of diethylether according to the procedure described in Example 1, the desired 2-(2,3,4,5,6,7,8,9,10,11 - decahydro - 1H-3-benzazepinyl)-ethylamine [or 3 - (2-aminoethyl) - 2,3,4,5,6,7,8,9,10,11-decahydro-1H-3-benzazepine] can be obtained; it is purified by distillation, B.P. 60–65°/0.025 mm.; yield: 3.3 g.

*Example 5*

A solution of 10.0 g. of 2-(1,2,3,4,5,6,7,8,9,10-decahydro-2-isoquinolyl)-ethylamine and 7.6 g. of S-methyl-isothiourea sulfate in 5.0 ml. of water is refluxed for five hours. The precipitate formed upon treating the cold reaction mixture with acetone, is filtered off and recrystallized from ethanol to yield the 2-(1,2,3,4,5,6,7,8,9,10-decahydro-2-isoquinolyl)-ethyl-guanidine sulfate [or 2-(2 - guanidino - ethyl)-1,2,3,4,5,6,7,8,9,10-decahydro-isoquinoline sulfate] of the formula:

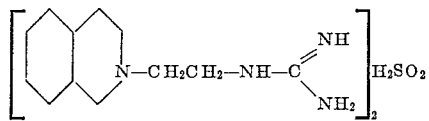

M.P. 195–199° (containing one mole of water); yield: 11.7 g.

The starting material may be prepared as follows: A mixture of 69 g. of 1,2,3,4,5,6,7,8,9,10-decahydro-isoquinoline, 41.5 g. of chloroacetonitrile and 206 g. of sodium carbonate in 250 ml. of toluene containing 0.5 ml. of water is refluxed while stirring for twelve hours. The mixture is filtered, the solid material is washed with toluene and the solvent of the filtrate is evaporated under reduced pressure. The remaining residue is distilled to yield the desired (1,2,3,4,5,6,7,8,9,10-decahydro-2-isoquinolyl)-acetonitrile (or 2-cyanomethyl-1,2,3,4,5,6,7,8,-9,10 - decahydro-isoquinoline), B.P. 164–170°/25 mm.; yield: 69 g.

To a solution of 15 g. of lithium aluminum hydride in 250 ml. of diethylether is added while stirring, cooling in an ice bath and maintaining an atmosphere of nitrogen, a solution of 34.5 g. of (1,2,3,4,5,6,7,8,9,10-decahydro-2-isoquinolyl)-acetonitrile in 250 ml. of diethylether over a period of five hours. After an additional hour of stirring, there is added in the following order 45 ml. of ethyl acetate, 15 ml. of water, 30 ml. of a 15 percent aqueous solution of sodium hydroxide and 45 ml. of water; stirring is continued for one-half hour, and the solid material is filtered off and washed with diethylether. The solvent is removed by distillation and the residue is distilled to yield the desired 2-(1,2,3,4,5,6,7,8,9,10-decahydro-2-isoquinolyl)-ethlamine [or 2-(2-aminoethyl)-1,2,3,4,5,6,7,8,9,10-decahydro-isoquinoline], B.P. 150–158°/25 mm., $n_D^{25}$ =1.4974; yield: 13 g.

*Example 6*

A mixture of 2-[3-(3-isogranataninyl)-]-ethylamine and 2.48 g. of S-methyl-isothiourea sulfate in 20 ml. of water is refluxed for four hours. 6.5 g. of a precipitate is filtered off and recrystallized from boiling water to yield the desired 2-(3-isogranataninyl)-ethyl guanidine sulfate [or 3-(2-guanidinoethyl)-3-isogranatanine sulfate] of the formula:

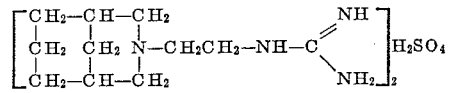

which melts at 295–330° after drying under reduced pressure.

The starting material may be prepared as follows: A solution of 8.5 g. of 3-isogranatanine in 100 ml. of toluene is added dropwise to a suspension of 5.15 g. of chloroacetonitrile and 16 g. of sodium carbonate in 50 ml. of tolene. The reaction mixture is refluxed for six hours, filtered and the solvent is evaporated under reduced pressure. An ether solution of the residue is dried over sodium sulfate and evaporated to yield 10.5 g. of [3-(3-isogranataninyl)]-acetonitrile (or 3-cyanomethyl-3-isogranatanine), M.P. 74–77°, after recrystallization from a mixture of acetone and water.

A solution of 9 g. of the (3-isogranataninyl)-acetonitrile in 50 ml. of diethylether is added to a solution of 3.0 g. of lithium aluminum hydride in 150 ml. of dry diethylether. The reaction mixture is refluxed for ten hours, stirred overnight and decomposed by adding 3 ml. of water, 3.9 ml. of 20 percent aqueous sodium hydroxide and 5 ml. of water. The solid material is filtered off, the filtrate is dried and evaporated to leave an oily residue, which is distilled to yield 4.2 g. of 2-[3-(3-isogranataninyl)]-ethylamine [or 3-(2-aminoethyl)-3-isogranatanine], B.P. 108–114°/ 13 mm.

Example 7

To a mixture of 5 g. of 2-(1,2,3,4,5,6,7,8-octahydro-2-cyclopenta[c]pyrryl-ethylamine in 5 ml. of water is added 4.5 g. of S-methyl-isothiourea sulfate. The mixture is refluxed until methyl mercaptan is no longer evolved and is then concentrated to dryness under reduced pressure. The residue, representing the 2-(1,2,3,4,5,6,7,8-octahydro-2-cyclopenta[c]pyrryl)-ethylguanidine sulfate [or 2-(2-guanidino-ethyl)-1,2,3,4,5,6,7,8-octahydro-cyclopenta[c]pyrrol sulfate] of the formula:

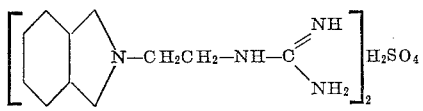

The starting material may be prepared as follows: 28.0 g. of 1,2-cis-cyclopentane dicarboxylic acid anhydride and 6.0 g. of ethylenediamine is mixed while stirring and then heated until water is no longer evolved. The desired 2-(1,3 - dioxo - 1,2,3,4,5,6,7,8-octahydro-2-cyclopenta[c]pyrryl)-ethylamine [or 2-(2-aminoethyl)-1,3-dioxo-1,2,3,4,5,6,7,8-octahydocyclopenta[c]pyrrol] is obtained by distillation under reduced pressure.

To a mixture of 13 g. of lithium aluminum hydride in 100 ml. of dry ether is added 18.2 g. of 2-(1,3-dioxo-1,2,3,4,5,6,7,8,9 - octahydro-2-cyclopenta[c]pyrryl)-ethylamine. After refluxing for five hours and stirring overnight, the reaction mixture is decomposed by adding 15 ml. of water, 10 ml. of a 20 percent aqueous sodium hydroxide solution and 45 ml. of water. After filtering and separating the aqueous phase, the organic layer is dried and evaporated, and the residue is distilled under reduced pressure to yield the desired 2-(1,2,3,4,5,6,7,8-octahydro-2-cyclopenta[c]pyrryl)-ethylamine [or 2-(2-aminoethyl)-1,2,3,4,5,6,7,8-octahydro-cyclopenta[c]pyrrol].

Example 8

A mixture of 6.5 g. of 2-(3-aza-3-bicyclo[3,2,2]nonyl)-ethylamine and 5.38 g. of S-methyl-isothiourea sulfate in 25 ml. of water is refluxed for four hours. Upon cooling, a precipitate is formed, which is filtered off to yield the 2 - (3-aza-3-bicyclo[3,2,2]nonyl)-ethyl-guanidine sulfate (or 3-(2-guanidinoethyl)-3-aza-bicyclo[3,2,2]nonane sulfate) of the formula:

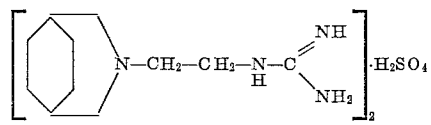

which melts at 280–295° (with decomposition) after recrystallization from water; yield: 80 percent.

The starting material is prepared as follows: A mixture of 3-aza-bicyclo[3,2,2]nonane, 7.55 g. of chloroacetonitrile and 22 g. of anhydrous sodium carbonate in 225 ml. of toluene is refluxed for six hours while stirring. After filtration, the filtrate is concentrated under reduced pressure, and the desired 3-aza-3-bicyclo[3,2,2]nonyl-acetonitrile (or 3 - cyanomethyl - 3 - aza - bicyclo[3,2,2]nonane) is isolated by distillation, B.P. 72–75°/0.1 mm.; it crystallizes on standing, M.P. 54–57°; yield: 80 percent.

A solution of 10.0 g. of 3-aza-3-bicyclo[3,2,2]nonyl acetonitrile in 150 ml. of tetrahydrofuran is slowly added to a solution of 3.48 g. of lithium aluminum hydride in 175 ml. of tetrahydrofuran while cooling. After refluxing for 21 hours and cooling 3.5 ml. of water, 4.5 ml. of a 20 percent aqueous solution of sodium hydroxide and 12 ml. of water are added. The solid material is filtered off, the solvent is evaporated and the residue is distilled to yield the desired 2-(3-aza-3-bicyclo[3,2,2]nonyl)-ethyl-amine (or 3-(2-aminoethyl)-3-aza-bicyclo[3,2,2]nonane), B.P. 70–72°/0.35 mm; yield: 80 percent.

Example 9

To a solution of 7.1 g. of 2-(2-isoquinuclidyl)-ethylamine in 5 ml. of water is added 6.4 g. of S-methyl-isothiourea sulfate; the solution is refluxed for three hours and then allowed to stand at room temperature and diluted with acetone. The solid material is filtered off, triturated with isopropanol and recrystallized from aqueous acetone to yield the 2-(2-isoquinuclidyl)-ethyl-guanidine sulfate (or 2-(guanidinoethyl)-isoquinuclidine sulfate) of the formula:

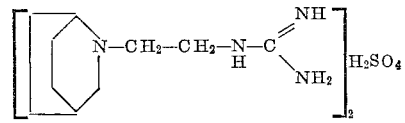

which melts at 258–261° (with decomposition); yield: 5.5 g. The salt contains one mole of water.

The starting materials are obtained according to the procedure described in Example 8, i.e. by reacting 13.7 g. of isoquinuclidine with 10.0 g. of chloroacetonitrile in the presence of 38.2 g. of sodium carbonate, 2.0 ml. of water and 200 ml. of toluene, to form the 2-isoquinuclidyl-acetonitrile (or 2-cyanomethyl-isoquinuclidine), B.P. 125–130°/17 mm. (yield: 9.5 g.), and reacting the latter with 5.7 g. of lithium aluminum hydride; the desired 2-(2-isoquinuclidyl)-ethylamine (or 2 - (2 - aminoethyl) - isoquinulcidine) boils at 110–114°/15–20 mm., yield: 7.1 g.

Example 10

A mixture of 9.8 g. of 2-(3-methyl-1,2,3,4,5,6,7,8,9,10-decahydro-isoquinolyl)-ethylamine and 7.0 g. of S-methyl-isothiourea sulfate in 10 ml. of a 1:1-mixture of ethanol and water is heated for three hours and is then allowed to stand at room temperature overnight. The solvent is distilled off, the residue is treated with acetone, the precipitate is filtered off to yield the desired 2-(3-methyl-1,2,3,4,5,6,7,8,9,10-decahydro-isoquinolyl)-ethyl-guanidine sulfate (or 2-(2-guanidinoethyl)-3-methyl - 1,2,3,4,5,6,7,8,9,10-decahydro-isoquinoline sulfate) of the formula:

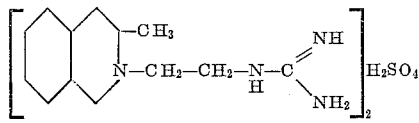

which melts at 253–257° (with decomposition) after recrystallization from ethanol containing a small amount of water.

The starting material is prepared as follows: A mixture of 44.0 g. of 3-methyl-isoquinoline and 2.5 g. of platinum oxide in 120 ml. of ethanol and 30 ml. of 4 N ethanolic hydrogen-chloride is treated with hydrogen at 3 atmospheres of pressure for four hours. The reaction mixture is heated to dissolve the precipitate, filtered hot and chilled. The precipitate is taken up in water, a 50 percent aqueous solution of sodium hydroxide is added and the 3-methyl-1,2,3,4-tetrahydro-isoquinoline is extracted into methylene chloride and used without further purification after evaporating the solvent.

To a benzene solution of 3-methyl-1,2,3,4-tetrahydro-isoquinoline and 33.1 ml. of N,N,N-triethylamine in benzene is slowly added while cooling 26.0 ml. of acetyl chloride in 150 ml. of benzene. The reaction mixture is heated on the steam bath for 45 minutes, then cooled and diluted with 325 ml. of water. The aqueous layer is extracted three times with benzene, the benzene solutions are combined, dried over magnesium sulfate and evaporated to yield the 2-acetyl-3-methyl-1,2,3,4-tetrahydro-isoquinoline, B.P. 130–136°/0.45 mm.

A mixture of 45.3 g. of 2-acetyl-3-methyl-1,2,3,4-tetrahydro-isoquinoline, two tablespoons of Raney nickel and 13.4 g. of calcium oxide in 250 ml. of tetrahydrofuran is hydrogenated for 24 hours at 200 atmospheres pressure and 200°. The reaction mixture is filtered, the filtrate is evaporated and the residue is distilled to yield the 2-acetyl-3 - methyl - 1,2,3,4,5,6,7,8,9,10 - decahydro - isoquinoline, which is recovered by distillation, and then heated in 225 ml. of concentrated hydrochloric acid for twelve hours. After standing overnight at room temperature, the precipitate is filtered off, the filtrate is evaporated, and the residue is dissolved in water. The aqueous solution is made basic with 2 N aqueous sodium sulfate, the organic material is extracted into methylene chloride, and the desired 3-methyl-1,2,3,4,5,6,7,8,9,10-decahydroisoquinoline is obtained by removing the solvent and distilling the residue.

The desired 2-(3-methyl-1,2,3,4,5,6,7,8,9,10-decahydroisoquinolyl) - ethylamine (or 2-(2-aminoethyl)-3-methyl-1,2,3,4,5,6,7,8,9,10 - decahydro-isoquinoline) is obtained according to the procedure described in Example 8, i.e. by reacting 17.0 g. of 3-methyl-1,2,3,4,5,6,7,8,9,10-decahydro-isoquinoline and 9.1 g. of chloroacetonitrile in the presence of 35 g. of sodium carbonate in 225 ml. of toluene and 2 ml. of water; 15.8 g. of the resulting 3-methyl-1,2,3,4,5,6,7,8,9,10-decahydro-2-isoquinolyl - acetonitrile (or 2 - cyanomethyl-3-methyl-1,2,3,4,5,6,7,8,9,10-decahydro-isoquinoline; B.P. 146-162°/20 mm.; yield: 15.8 g.) is then treated with 6.2 g. of lithium aluminum hydride to give the desired starting material, B.P. 80–90°/0.35 mm.; yield: 12.0 g.

*Example 11*

A mixture of 3.5 g. of 3-(3-methyl-1,2,3,4,5,6,7,8,9,10-decahydro-2-isoquinolyl)-propylamine and 2.4 g. of S-methyl-isothiourea sulfate in 5 ml. of a 1:1-mixture of ethanol and water is refluxed for three hours and then allowed to stand overnight at room temperature. Acetone is added and the precipitate is filtered off and air dried. The desired 3-(3-methyl-1,2,3,4,5,6,7,8,9,10-decahydro-2-isoquinolyl)-propylguanidine sulfate (or 2-(3-guanidinopropyl)-3-methyl-1,2,3,4,5,6,7,8,9,10-decahydro-isoquinoline sulfate) of the formula:

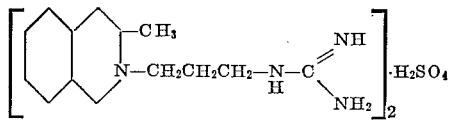

is recrystallized from aqueous ethanol, M.P. 230-235°; yield: 2.7 g.

The starting material is prepared as follows: To a mixture of 11.6 g. of 3-methyl-1,2,3,4,5,6,7,8,9,10-decahydroisoquinoline and 4.0 g. of acrylonitrile is added five drops of benzyl-trimethylammonium hydroxide. After heating on the steam bath overnight, the resulting β-(3-methyl-1,2,3,4,5,6,7,8,9,10-decahydro-2 - isoquinolyl) - propionitrile (or 2-(2-cyanoethyl)-3-methyl - 1,2,3,4,5,6,7,8,9,10-decahydro-isoquinoline) is recovered by distillation, B.P. 122-134°/0.4 mm.; yield: 6.7 g.

A solution of 6.7 g. of β-(3-methyl-1,2,3,4,5,6,7,8,9,10-decahydro-2-isoquinolyl)-propionitrile in 50 ml. of diethyl ether is added dropwise to 2.5 g. of lithium aluminum hydride; the reaction mixture is stirred for an additional two hours and then allowed to stand overnight. While cooling in an ice bath, 7.2 ml. of ethyl acetate, 2.4 ml. of water, 4.8 ml. of a 15 percent aqueous solution of sodium hydroxide and 7.2 ml. of water are added, and stirring is continued for one-half hour at room temperature. The inorganic precipitate is filtered off, washed three times with diethyl ether and the combined organic solutions are evaporated to dryness. The desired 3-(3-methyl-1,2,3,4,5,6,7,8,9,10 - decahydro-2-isoquinolyl) - propylamine (or 2-(3-aminopropyl)-3-methyl-1,2,3,4,5,6,7,8,9,10-decahydro-isoquinoline) is recovered by distillation, B.P. 94-100°/0.25-0.15 mm.

*Example 12*

A solution of 2.5 g. of 2-(6-aza-6-bicyclo[3,2,1]octyl)-ethylamine and 2.2 g. of S-methyl-isothiourea sulfate in 5 ml. of water is refluxed for three hours. The water is removed by repeated dilution with anhydrous ethanol and distillation. Finally, the ethanolic solution is diluted with acetone yielding a white crystalline precipitation. It is filtered off and recrystallized from aqueous ethanol-acetone. The so obtained 2-(6-aza-6-bicyclo[3,2,1]octyl)-ethylguanidine sulfate dihydrate of the formula melts at

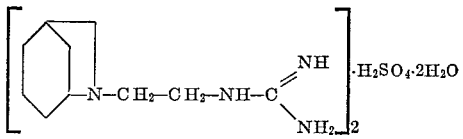

245-249°; yield: 2.1 g.

The starting material can be prepared as follows:

A mixture of 15.0 g. of 6-azabicyclo[3,2,1]octane, 10.8 g. of chloroacetonitrile, 43.0 g. of sodium carbonate, 1 ml. of water and 200 ml. of toluene is refluxed for 12 hours with stirring. The hot solution is filtered and the solvent removed from the filtrate in vacuo. The residue is distilled under reduced pressure, B.P. 130-132°/24 mm.; yield: 8.3 g.

The so obtained 6-aza-6-bicyclo [3,2,1]octyl-acetonitrile contained in 50 ml. of tetrahydrofurane is added within two hours to a stirred suspension of 5.0 g. of lithium aluminum hydride in 100 ml. of tetrahydrofurane. Stirring is continued for three additional hours and then the mixture is allowed to stand at room temperature overnight. Thereupon it is treated with 15 ml. of ethyl acetate, 5 ml. of water, 10 ml. of a 15 percent aqueous sodium hydroxide solution and 15 ml. of water while cooling and stirring. The inorganic material is filtered off and the filtrate concentrated by distillation. The obtained 2-(6-aza-6-bicyclo[3,2,1]octyl)-ethylamine is distilled under reduced pressure, B.P. 110-116°/21 mm.; yield: 5.5 g.

*Example 13*

3.6 g. of 2-(9-aza-9-bicyclo[4,2,1]nona-2,4-dienyl)-ethylamine are dissolved in 5 ml. of water, 3.05 g. of S-methyl-isothiourea sulfate are added and the homogenous solution is refluxed for five hours. After cooling acetone is added to get a gummy solid which is triturated repeatedly with acetone. The solid material is dissolved in ethanol of 95% strength, the solution treated with charcoal filtered and the filtrate diluted with acetone. The precipitated 2-(9-aza-9-bicyclo[4,2,1]nona-2,4 - dienyl)-ethylguanidine sulfate of the formula

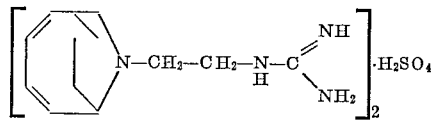

is filtered off, washed with acetone and dried over phosphorus pentoxide at 0.1 mm. pressure and room temperature. The product is amorphous and contains 2½ moles of water.

The starting material can be prepared as follows: A mixture of 50 g. of cyclooctatetraene, 400 g. of ethylenediamine and 400 ml. of water is heated at 200° C. for twelve hours in a closed vessel. After cooling the reaction mixture is distilled through a one foot Widmer column to a low volume. The residue is then fractionated in vacuo and the fraction boiling at 56-76°/0.35 mm. ($n_D^{27}$=1.5268) representing the 2 - (9 - aza - 9 - bicyclo [4,2,1]nona-2,4-dienyl)-ethylamine collected; yield: 3.6 g.

What is claimed is:

1. A member selected from the group consisting of a compound of the Formula 2

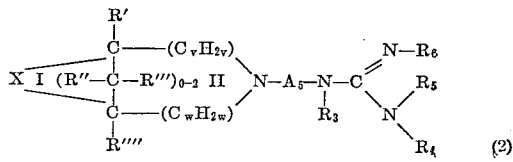

in which X represents a member selected from the group consisting of 1,2-ethylene, 1,3-propylene, 1,4-butylene, 1,2-ethenylene, 1,3-propenylene, 1,4-buta-2-enylene and 1,4-buta-1,3-dienylene, each of the radicals R', R", R''' and R'''' stands for a member selected from the group consisting of hydrogen and methyl, each of the letters $v$ and $w$ represents an integer from 0 to 3, $A_5$ represents alkylene with one to seven carbon atoms, each of the radicals $R_3$ and $R_4$ stands for a member selected from the group consisting of hydrogen and a lower alkyl radical and each of the radicals $R_5$ and $R_6$ represents a member selected from the group consisting of hydrogen, lower alkyl and the acyl radical of a lower alkane monocarboxylic acid, with the proviso that the carbocyclic ring I and the aza-cyclic ring II both have at least five atoms as ring members, and with the further proviso that at least one of the radicals $R_5$ and $R_6$ stands for hydrogen, and a pharmaceutically acceptable, non-toxic acid addition salt thereof.

2. A compound of the Formula 3

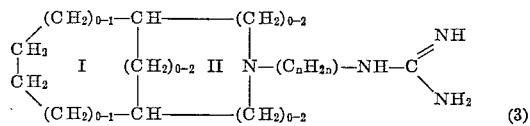

in which the letter $n$ is an integer from 2 to 3, and with the proviso that both the carbocyclic ring I and the aza-cyclic ring II have at least five atoms as ring members.

3. A pharmaceutically acceptable, non-toxic acid addition salt of a compound with the Formula 3 shown in claim 2.

4. A compound of the Formula 4

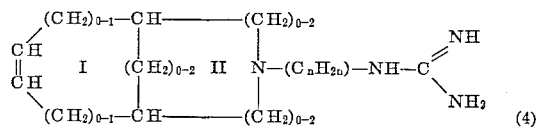

in which the letter $n$ is an integer from 2 to 3, and with the proviso that both the carbocyclic ring I and the aza-cyclic ring II have at least five atoms as ring members.

5. A pharmaceutically acceptable, non-toxic acid addition salt of a compound with the Formula 4 shown in claim 4.

6. A compound of the Formula 5

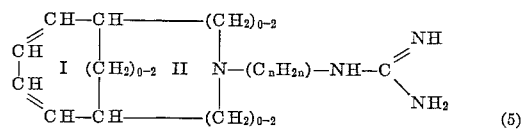

in which the letter $n$ is an integer from 2 to 3, and with the proviso that the azacyclic ring II has at least five atoms as ring members.

7. A pharmaceutically acceptable, non-toxic acid addition salt of a compound with the Formula 5 shown in claim 6.

8. 2 - (4,5,6,7,8,9 - hexahydro-1-indolinyl)-ethyl-guanidine.

9. A pharmaceutically acceptable, non-toxic acid addition salt of 2-(4,5,6,7,8,9-hexahydro-1-indolinyl)-ethyl-guanidine.

10. 2 - (4,5,6,7,8,9 - hexahydro - 2-isoindolinyl)-ethyl-guanidine.

11. A pharmaceutically acceptable, non-toxic acid addition salt of 2-(4,5,6,7,8,9-hexahydro-2-isoindolinyl)-ethyl-guanidine.

12. 2 - (2,3,4,5,6,7,8,9,10,11 - decahydro - 1H-3-benzazepinyl)-ethyl-guanidine.

13. A pharmaceutically acceptable, non-toxic acid addition salt of 2-(2,3,4,5,6,7,8,9,10,11-decahydro-1H-3-benzazepinyl)-ethyl-guanidine.

14. 2 - (1,2,3,4,5,6,7,8,9,10 - decahydro - 2 - isoquinolinyl)-ethyl-guanidine.

15. A pharmaceutically acceptable, non-toxic acid addition salt of 2-(1,2,3,4,5,6,7,8,9,10-decahydro-2-isoquinolinyl)-ethyl-guanidine.

16. 2-(3-isogranataninyl)-ethyl-guanidine.

17. A pharmaceutically acceptable non-toxic acid addition salt of 2-(3-isogranataninyl)-ethyl-guanidine.

18. 2-(1,2,3,4,5,6,7,8-octahydro-2-cyclopenta[c]pyrryl-ethyl-guanidine.

19. A pharmaceutically acceptable, non-toxic acid addition salt of 2-(1,2,3,4,5,6,7,8-octahydro-2-cyclopenta[c]pyrryl-ethyl-guanidine.

20. 2-(3-aza-3-bicyclo[3,2,2]nonyl)-ethyl-guanidine.

21. A pharmaceutically acceptable, non-toxic acid addition salt of 2-(3-aza-3-bicyclo[3,2,2]nonyl)-ethyl-guanidine.

22. 2-(2-isoquinuclidyl)-ethyl-guanidine.

23. A pharmaceutically acceptable, non-toxic acid addition salt of 2-(2-isoquinuclidyl)-ethyl-guanidine.

24. 2 - (3 - methyl - 1,2,3,4,5,6,7,8,9,10 - decahydro-isoquinolyl)-ethyl-guanidine.

25. A pharmaceutically acceptable, non-toxic acid addition salt of 2-(3-methyl-1,2,3,4,5,6,7,8,9,10-decahydroisoquinolyl)-ethyl-guanidine.

26. 3 - (3 - methyl - 1,2,3,4,5,6,7,8,9,10 - decahydro-isoquinolyl)-propyl-guanidine.

27. A pharmaceutically acceptable, non-toxic acid addition salt of 3-(3-methyl-1,2,3,4,5,6,7,8,9,10-decahydro-isoquinolyl)-propyl-guanidine.

28. 2-(6-aza-6-bicyclo[3,2,1]octyl)-ethyl-guanidine.

29. A pharmaceutically acceptable, non-toxic acid addition salt of 2-(6-aza-6-bicyclo[3,2,1]octyl)-ethyl-guanidine.

30. 2 - (4,7,8,9 - tetrahydro - 2 - isoindolinyl) - ethyl-guanidine.

31. A pharmaceutically acceptable, non-toxic acid addition salt of 2-(4,7,8,9-tetrahydro-2-isoindolinyl)-ethyl-guanidine.

32. 2 - (9 - aza - 9 - bicyclo[4,2,1]nona - 2,4 - dienyl)-ethyl-guanidine.

33. A pharmaceutically acceptable, non-toxic acid addition salt of 2-(9-aza-9-bicyclo[4,2,1]nona-2,4-dienyl)-ethyl-guanidine.

References Cited by the Examiner
UNITED STATES PATENTS 3,055,883  9/1962  Mull _____ 260—239

WALTER A. MODANCE, *Primary Examiner.*

IRVING MARCUS, *Examiner.*

J. T. MILLER, AVROM D. SPEVACK,
*Assistant Examiners.*